(12) United States Patent
Pirc Vargec

(10) Patent No.: US 11,342,830 B2
(45) Date of Patent: May 24, 2022

(54) ELECTROMECHANICAL DRIVE SYSTEM

(71) Applicant: METCON d.o.o., Brežice (SI)

(72) Inventor: Manca Pirc Vargec, Brežice (SI)

(73) Assignee: METCON d.o.o., Brežice (SI)

( * ) Notice: Subject to any disclaimer, the term of this patent is extended or adjusted under 35 U.S.C. 154(b) by 115 days.

(21) Appl. No.: 16/627,612

(22) PCT Filed: Jun. 22, 2018

(86) PCT No.: PCT/IB2018/054615
§ 371 (c)(1),
(2) Date: Dec. 30, 2019

(87) PCT Pub. No.: WO2019/003070
PCT Pub. Date: Jan. 3, 2019

(65) Prior Publication Data
US 2021/0028682 A1 Jan. 28, 2021

(30) Foreign Application Priority Data
Jun. 29, 2017 (SI) .................................. P-201700196

(51) Int. Cl.
*H02K 51/00* (2006.01)
*H02K 11/30* (2016.01)
(Continued)

(52) U.S. Cl.
CPC .............. *H02K 51/00* (2013.01); *H02K 9/08* (2013.01); *H02K 9/19* (2013.01); *H02K 11/0094* (2013.01);
(Continued)

(58) Field of Classification Search
CPC ........ H02K 47/20; H02K 53/00; H02K 51/00; H02K 47/00; H02K 99/10; H02N 11/00; H02N 11/002; H02N 11/008
(Continued)

(56) References Cited

U.S. PATENT DOCUMENTS 5,689,174 A * 11/1997 Pacheco, Sr. ......... H02J 7/1415
322/16
8,872,403 B2 * 10/2014 Galvan .................. H02K 16/04
310/113
(Continued)

FOREIGN PATENT DOCUMENTS

CN 106 602 843 A 4/2017
DE 102010006989 A1 * 8/2011 ............. H02K 53/00
(Continued)

OTHER PUBLICATIONS

International Search Report issued in PCT/IB2018/054615; dated Sep. 27, 2018.

*Primary Examiner* — Burton S Mullins
(74) *Attorney, Agent, or Firm* — Studebaker & Brackett PC

(57) ABSTRACT

An electromechanical drive system for a mechanical power load. The system includes an electric motor connectable to an electric power source, a first transmission connected at one side with a first end of the shaft of the electric motor and connectable at the other end with a load, an electric power generator, and a second transmission connected at one side with a second end of the shaft of the electric motor, which extends in a direction opposite to that of the first end of the shaft of the electric motor, and which is connected at the other side with the electric power generator, wherein the electric power generator is electrically connectable via a switch with a power source and the electric motor, such that the electric current from the power generator can be directed either to electric power source or to an electric motor, with which charging of the electric power source is achieved when a need of the load for mechanical power is reduced.

8 Claims, 2 Drawing Sheets

Figure 1:
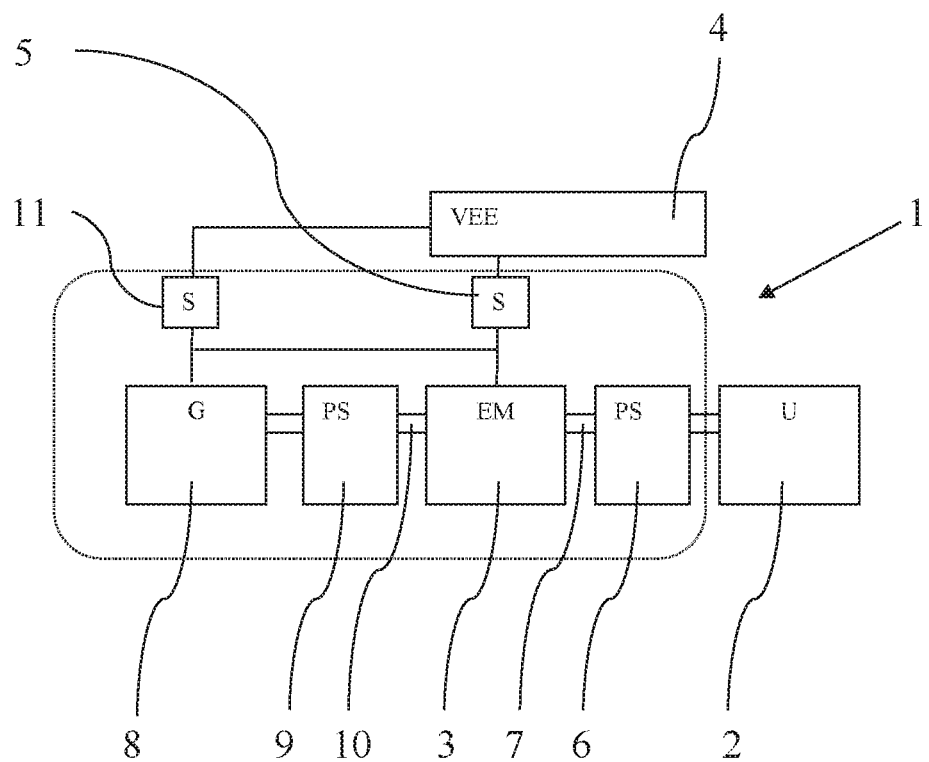

(51) Int. Cl.
    *H02K 11/01*    (2016.01)
    *H02K 9/08*     (2006.01)
    *H02K 9/19*     (2006.01)
    *H02K 11/00*    (2016.01)
(52) U.S. Cl.
    CPC ......... *H02K 11/0141* (2020.08); *H02K 11/30* (2016.01)
(58) Field of Classification Search
    USPC ........................................................ 310/113
    See application file for complete search history.

(56)         References Cited

U.S. PATENT DOCUMENTS

| | | | |
|---|---|---|---|
| 10,020,721 B2 * | 7/2018 | Davis ........................ | H02J 7/34 |
| 10,461,622 B2 * | 10/2019 | Miller ..................... | H02K 53/00 |
| 2011/0050134 A1 * | 3/2011 | Kissane ................. | H02K 53/00 |
| | | | 318/139 |
| 2012/0262018 A1 * | 10/2012 | Thiara .................... | H02K 53/00 |
| | | | 310/113 |
| 2012/0299414 A1 * | 11/2012 | Laita ...................... | H02K 53/00 |
| | | | 310/74 |
| 2017/0141671 A1 * | 5/2017 | Stubbings .............. | H02K 53/00 |

FOREIGN PATENT DOCUMENTS

| | | | | |
|---|---|---|---|---|
| DE | 10 2011 107976 A1 | 1/2013 | | |
| EP | 0 083 369 B1 | 4/1987 | | |
| GB | 2366455 A * | 9/2000 | ............. | H02K 53/00 |
| WO | 9408385 A1 * | 4/1994 | ............. | H02K 53/00 |

\* cited by examiner

ELECTROMECHANICAL DRIVE SYSTEM

FIELD OF INVENTION

The invention refers to an electromechanical drive system for driving the devices which need mechanical energy in the form of a torque for their operation.

PRIOR ART

A vast variety of drive systems is known from prior art. In general, these systems comprise a primary drive, a transmission for the transfer of power generated by the primary drive to a device that needs work for its operation.

Patent EP 0 083 369 B1 discloses a system that is supplied by a battery. Battery exhaustion is a serious limitation in loads that require much power for their operation. The underlying task of the invention is to provide a system that will use a small high revolution electric motor to generate power for a heavily loaded load and at the same time reduce the battery exhaustion to a minimum level. The invention solves the task by a feedback loop of a generator and by a voltage controller, which are constantly connected in the circuit, such that no switching between a drive mode and a charging mode occurs. The system is a combination of a mechanism reducing the number of revolutions and a mechanism increasing the number of revolutions by hydrostatic transmission, with which an increase in power is attained and which comprises a hydraulic pump and a hydraulic motor. Hydraulic transmission is controllable to control the output speed of its mechanical output based on the speed of the mechanical input. A coupling and drive mechanism provides for the power distribution to the load and the electric generator which charges the battery via the voltage controller. The battery is regenerated. The author of the invention further noticed that the life span of the battery is simultaneously extended.

A drawback of this solution is a large number of various components resulting in the system being more expensive; moreover, these components occupy much space.

Technical Problem

The technical problem is how to conceive such an electromechanical drive system that will have a simple construction and will adapt its power to current needs of a load, while it will charge the power source in the event of a reduced need of the electric motor for power. A further technical problem solved by the invention is how to provide an electromechanical drive system that does not occupy much space and has a compact construction.

Solution to the Technical Problem

The technical problem is solved by an electromechanical drive system for a mechanical power load, the electromechanical drive system comprising:
- at least one electric motor connectable to an electric power source and provided with a shaft,
- a first switch for switching the electromechanical drive system on/off,
- at least a first transmission connected at one side with a first end of the shaft of the electric motor and connectable at the other end with a load,
- at least one electric power generator, and
- at least one second transmission connected at one side with a second end of the shaft of the electric motor, which extends in a direction opposite to that of the first end of the shaft of the electric motor, and which is connected at the other side with the electric power generator, wherein the electric power generator is electrically connectable via a second switch with an electric power source and the electric motor, such that the electric current from the power generator can be directed to the electric motor and/or to the electric power source.

Once the electromechanical drive system is switched on with the first ON/OFF switch, the electric motor gets electric power from the electric power source. The electric motor converts the electric power to mechanical power which is readily available to the load for its operation via the first transmission in the form of a torque. At the same time, the electric motor provides mechanical energy through the second end of the shaft and the second transmission to the electric power generator which generates electric power. This electric power is supplied to the electric motor based on the needs, wherewith its electric power is increased resulting in an increased mechanical power. If there is no need for a higher mechanical power, the electric power generated in the electric power generator, can be supplied to the electric power source via the second switch.

The electric motor having two ends of the shaft makes it possible to drive a mechanical energy load and the electric generator at the same moment. The electric generator can thus supply additional electric power to the electric motor or simultaneously charges the electric power source. The advantage of the electromechanical drive system of the invention lies in that it provides for a simple system having a low number of components and is adaptable to the energy needs of a load.

FIG. 1: Schematic illustration of an electromechanical drive system

Figure 2:
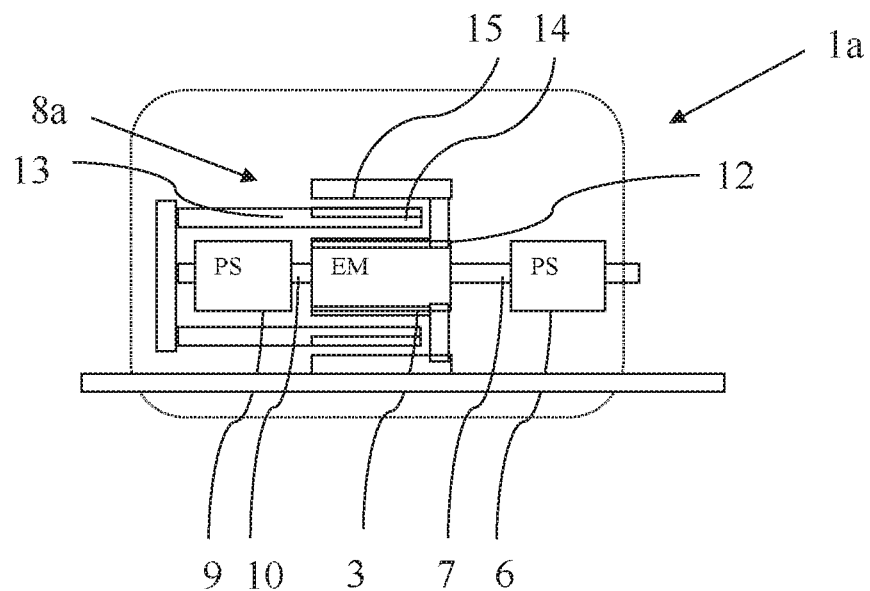
Figure 3:
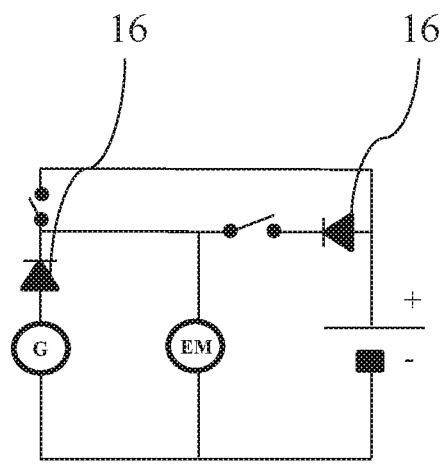

FIG. 2: Schematic illustration of an electromechanical drive system with a compact design FIG. 3: Embodiment of an electric circuit of an electromechanical drive system with two semiconductor diodes.

The invention is described in more detail hereinbelow.

The technical problem is solved by an electromechanical drive system 1, 1a for a mechanical power load 2, the electromechanical drive system 1 comprising:
- at least one electric motor 3 connectable to an electric power source 4 and provided with a shaft,
- a first switch 5 for switching the electromechanical drive system 1, 1a on/off,
- at least a first transmission 6 connected at one side with a first end of the shaft 7 of the electric motor and connectable at the other end with a load 2,
- at least one electric power generator 8, 8a, and
- at least one second transmission 9 connected at one side with a second end 10 of the shaft of the electric motor, which extends in a direction opposite to that of the first end of the shaft of the electric motor 3, and which is connected at the other side with the electric power generator 8, 8a, wherein the electric power generator 8, 8a is electrically connectable via a second switch 11 with an electric power source 4 and the electric motor 3, such that the electric current from the power generator 8, 8a can be directed to the electric motor 3 and/or to the electric power source 4.

Once the electromechanical drive system 1, 1a is switched on with the first ON/OFF switch 5, the electric motor 3 gets electric power from the electric power source 4. The electric motor 3 converts the electric power to mechanical power which is readily available to the load 2 for its operation via the first transmission 6 in the form of a torque. At the same time, the electric motor 3 provides mechanical energy through the second end 10 of the shaft and the second transmission 9 to the electric power generator 8, 8a which generates electric power. This electric power is supplied to the electric motor 3 based on the needs, wherewith its electric power is increased resulting in an increased mechanical power. If there is no need for a higher mechanical power, the electric power generated in the electric power generator, can be supplied also to the electric power source 4 via the second switch 11.

The electric conductor between the electric power generator 8 and the electric motor 3 and the electric conductor between the electric motor 3 and the electric power source 4 can be each provided with a semiconductor diode 16.

The electric power source 4 can be an electric supply network, a battery, a rechargeable battery pack, etc.

The electric motor 3 and the electric power generator 8, 8a can be arbitrarily selected and can be: an AC or a DC, a single-phase or a multi-phase, a synchronous or an asynchronous, a brush or a brushless motor/generator, a motor/generator with permanent magnets or electromagnets, with water or air cooling, etc.

The electromechanical drive system 1, 1a can include a control system and/or other elements and devices serving individual operational and output requirements defined by the user, such as an inverter, a frequency converter, etc.

The first and the second transmissions 6, 9 are selected based on the needs of the load among a stiff transmission system, belt transmission, gear transmission, clutch, mechanical switch, chain transmission, pneumatic transmission, hydraulic transmission, magnetic transmission, etc.

A further embodiment of the electromechanical drive system 1a enables a more compact structure of the system. In this embodiment, the shell of the electric motor is circumferentially coated with an electromagnetically insulating layer 12 that prevents mutual electromagnetic influence between the electric motor 3 and the electric power generator 8a. A rotor 13 of the electric power generator is formed as a socket able to receive a second transmission and at least one portion of the electric motor, preferably a predominant part of the electric motor. Within the rotor 13 of the electric power generator, magnets 14 are circumferentially provided, which can be either permanent magnets or electromagnets. The electromagnet can be a short-circuit cage. On the part of the electric motor 3, beyond which the rotor of the electric power generator does not project, a stator 15 of the electric power generator is circumferentially arranged and stiffly connected with it. The circumferential part of the stator 15 of the electric power generator extending circumferentially around a part of the rotor 13 of the electric power generator with magnets, accommodates coils for inducing electric current and other elements needed for electric power generation and transfer to the electric motor or the electric power source.

The electromechanical drive system 1a can comprise a cooling device for cooling the electromechanical drive system.

The invention claimed is:

1. An electromechanical drive system for a mechanical power load, the electromechanical drive system comprising:
   at least one electric motor connectable to an electric power source and provided with a shaft,
   a first switch for switching the electromechanical drive system on/off,
   at least a first transmission connectable at one side of the first transmission with a load,
   at least one electric power generator, and
   at least one second transmission,
   the second transmission connected at one side of the second transmission with the electric power generator,
   wherein the first transmission is connected at another side of the first transmission with a first end of the shaft of the electric motor, and
   the second transmission is connected at another side of the second transmission with a second end of the shaft of the electric motor, which extends in a direction opposite to that of the first end of the shaft of the electric motor, and
   wherein the electric power generator is electrically connected via a second switch with the electric power source and the electric motor, such that the electric current from the power generator is directed to the electric motor and/or to the electric power source,
   a rotor of the electric power generator being formed as a sleeve such to receive the second transmission and at least one portion of the electric motor, wherein the rotor of the electric power generator accommodating circumferentially arranged magnets, and wherein on a part of the electric motor, beyond which the rotor of the electric power generator does not project, a stator of the electric power generator being circumferentially arranged and connected with it, wherein the circumferential part of the stator of the electric power generator extending circumferentially around a part of the rotor of the electric power generator with magnets, accommodating coils for inducing electric current, wherein a shell of the electric motor being circumferentially coated with an electromagnetically insulating layer preventing mutual electromagnetic influence between the electric motor and the electric power generator.

2. The electromechanical drive system according to claim 1, wherein another electric conductor between the electric power generator and another electric motor and the electric conductor between the electric motor and the electric power source is provided with a semiconductor diode.

3. The electromechanical drive system according to claim 1, wherein the electric power source is selected among an electric supply network, a battery, and a rechargeable battery pack.

4. The electromechanical drive system according to claim 1, further comprising a control system.

5. The electromechanical drive system according to claim 1, wherein the first and the second transmissions are selected among a belt transmission, gear transmission, clutch, mechanical switch, chain transmission, pneumatic transmission, hydraulic transmission, and magnetic transmission.

6. The electromechanical drive system according to claim 1, wherein the electric motor is selected among an AC or a DC, a single-phase or a multi-phase, a synchronous or an asynchronous, a brush or a brushless electric motor, an electric motor with water or air cooling, with permanent magnets or electromagnets.

7. The electromechanical drive system according to claim 1, wherein the electric power generator is selected among an AC or a DC, a single-phase or a multi-phase, a synchronous or an asynchronous, a brush or a brushless generator, a generator with water or air cooling, with permanent magnets or electromagnets.

8. The electromechanical drive system according to claim 1, further comprising a cooling device for cooling the electromechanical drive system.

* * * * *